(12) United States Patent
Malhotra et al.

(10) Patent No.: US 10,299,184 B1
(45) Date of Patent: May 21, 2019

(54) RESELECTION OF OPTIMAL NETWORK ELEMENTS

(71) Applicant: Sprint Communications Company L.P., Overland Park, KS (US)

(72) Inventors: Rajil Malhotra, Olathe, KS (US); Chidambaram Pavanasam, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 105 days.

(21) Appl. No.: 15/472,031

(22) Filed: Mar. 28, 2017

(51) Int. Cl.
| | |
|---|---|
| *H04W 36/38* | (2009.01) |
| *H04W 36/00* | (2009.01) |
| *H04L 29/12* | (2006.01) |
| *H04W 36/30* | (2009.01) |
| *H04W 88/16* | (2009.01) |
| *H04W 88/02* | (2009.01) |

(52) U.S. Cl.
CPC ......... *H04W 36/38* (2013.01); *H04L 61/1511* (2013.01); *H04W 36/0055* (2013.01); *H04W 36/30* (2013.01); *H04W 36/0033* (2013.01); *H04W 88/02* (2013.01); *H04W 88/16* (2013.01)

(58) Field of Classification Search
CPC combination set(s) only.
See application file for complete search history.

(56) References Cited

U.S. PATENT DOCUMENTS

| | | | |
|---|---|---|---|
| 8,923,863 B2 | 12/2014 | Bhaskaran et al. | |
| 9,439,060 B2 | 9/2016 | Liu et al. | |
| 2007/0254667 A1 | 11/2007 | Jokinen | |
| 2014/0036873 A1 | 2/2014 | Cheng et al. | |
| 2016/0150393 A1* | 5/2016 | Ratcliffe | H04W 76/028 455/435.1 |
| 2016/0174120 A1* | 6/2016 | Zembutsu | H04W 36/0005 370/331 |
| 2016/0226922 A1 | 8/2016 | Russell et al. | |
| 2016/0227385 A1 | 8/2016 | Ahmad et al. | |
| 2016/0381662 A1 | 12/2016 | Wang et al. | |
| 2017/0188280 A1* | 6/2017 | Watfa | H04W 36/0055 |

* cited by examiner

Primary Examiner — Vinncelas Louis

(57) ABSTRACT

A mobility management entity (MME) in a data communication system to facilitate reselection of optimal network elements for a wireless communication device traversing MME regional boundaries comprises a communication transceiver and a processing system. The communication transceiver is configured to receive a context transfer associated with the wireless communication device transmitted from an old MME that previously served the wireless communication device, and receive a tracking area update transmitted from the wireless communication device. The processing system is configured to, in response to the tracking area update, determine whether or not to select a new serving gateway for the wireless communication device, and upon determining to select the new serving gateway for the wireless communication device, direct the communication transceiver to transfer a reattach instruction for delivery to the wireless communication device.

17 Claims, 5 Drawing Sheets

US 10,299,184 B1

RESELECTION OF OPTIMAL NETWORK ELEMENTS

TECHNICAL BACKGROUND

Wireless communication systems typically include wireless access nodes which provide access to communication services for wireless communication devices over wireless links. In Long Term Evolution (LTE) communication systems, a user operates a wireless communication device, referred to as User Equipment (UE), to communicate with an eNodeB base station for data services over the LTE access network. To facilitate the provision of these data services, LTE communication systems often employ an Internet Protocol Multimedia Subsystem (IMS). The IMS is designed to enable delivery of real-time multimedia services to communication devices operated by users requesting these services. The IMS provides a control system to enable the exchange of Internet Protocol (IP) packets for Voice over IP (VoIP) and VoLTE calls, streaming media sessions, and other data transfer services. The IMS typically utilizes the Session Initiation Protocol (SIP) to facilitate communication session setup and tear-down. Essentially, the IMS operates as a horizontal control layer that isolates an access network from the service layer that provides the content or services requested by the users.

When a UE initially attempts to register with the network, a mobility management entity (MME) authenticates the user by interacting with the home subscriber server (HSS). Upon successful authentication, the MME facilitates the initial attachment of the UE to the network by selecting a serving gateway (S-GW) for the UE. The S-GW then routes and forwards user data packets to at least one packet data network gateway (P-GW). The P-GW then provides a point of ingress and egress for user data traffic with an external packet data network, such as the Internet.

Overview

A method of operating a mobility management entity (MME) in a data communication system to facilitate reselection of optimal network elements for a wireless communication device traversing MME regional boundaries is disclosed. The method comprises receiving a context transfer associated with the wireless communication device transmitted from an old MME that previously served the wireless communication device. The method further comprises receiving a tracking area update transmitted from the wireless communication device. The method further comprises, in response to the tracking area update, determining whether or not to select a new serving gateway for the wireless communication device. The method further comprises, upon determining to select the new serving gateway for the wireless communication device, transferring a reattach instruction for delivery to the wireless communication device.

An MME in a data communication system to facilitate reselection of optimal network elements for a wireless communication device traversing MME regional boundaries comprises a communication transceiver and a processing system. The communication transceiver is configured to receive a context transfer associated with the wireless communication device transmitted from an old MME that previously served the wireless communication device, and receive a tracking area update transmitted from the wireless communication device. The processing system is configured to, in response to the tracking area update, determine whether or not to select a new serving gateway for the wireless communication device, and upon determining to select the new serving gateway for the wireless communication device, direct the communication transceiver to transfer a reattach instruction for delivery to the wireless communication device.

One or more computer-readable storage media to facilitate reselection of optimal network elements for a wireless communication device traversing mobility management entity (MME) regional boundaries comprises program instructions stored thereon. The program instructions, when executed by an MME, direct the MME to at least receive a context transfer associated with the wireless communication device transmitted from an old MME that previously served the wireless communication device, and receive a tracking area update transmitted from the wireless communication device. The program instructions further direct the MME to, in response to the tracking area update, determine whether or not to select a new serving gateway for the wireless communication device, and upon determining to select the new serving gateway for the wireless communication device, transfer a reattach instruction for delivery to the wireless communication device.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
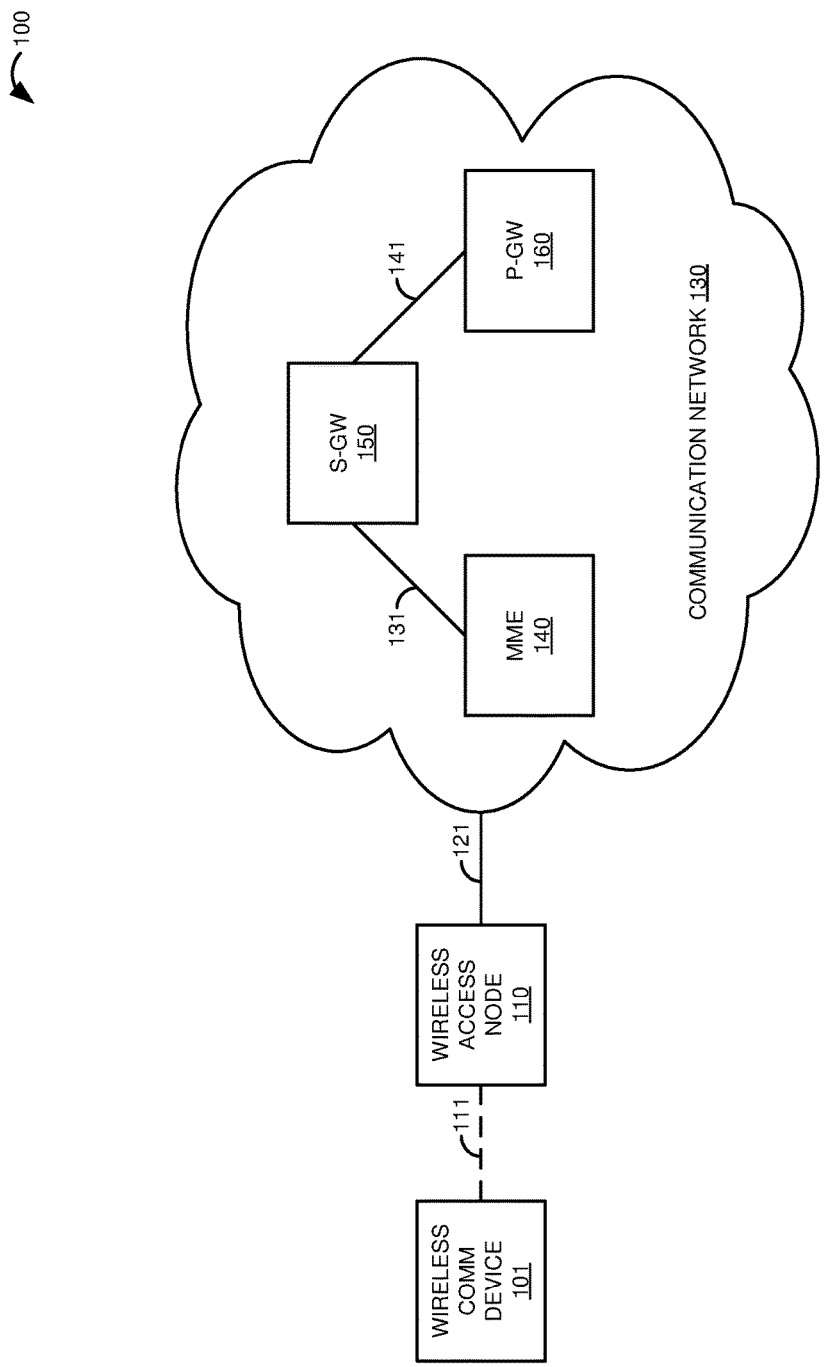
FIG. 1 is a block diagram that illustrates a data communication system.

FIG. 1 is a block diagram that illustrates data communication system 100. Data communication system 100 includes wireless communication device 101, wireless access node 110, and communication network 130. Communication network 130 includes mobility management entity (MME) 140, serving gateway (S-GW) 150, and packet data network gateway (P-GW) 160. Wireless communication device 101 and wireless access node 110 are in communication over wireless communication link 111. Wireless access node 110 and communication network 130 communicate over communication link 121. Within communication network 130, MME 140 and S-GW 150 communicate over communication link 131, while S-GW 150 and P-GW 160 are in communication over communication link 141. In some examples, communication network 130 may comprise an internet communication network, a Long Term Evolution (LTE) communication network, and/or an internet protocol multimedia subsystem (IMS), including combinations thereof.

Figure 2:
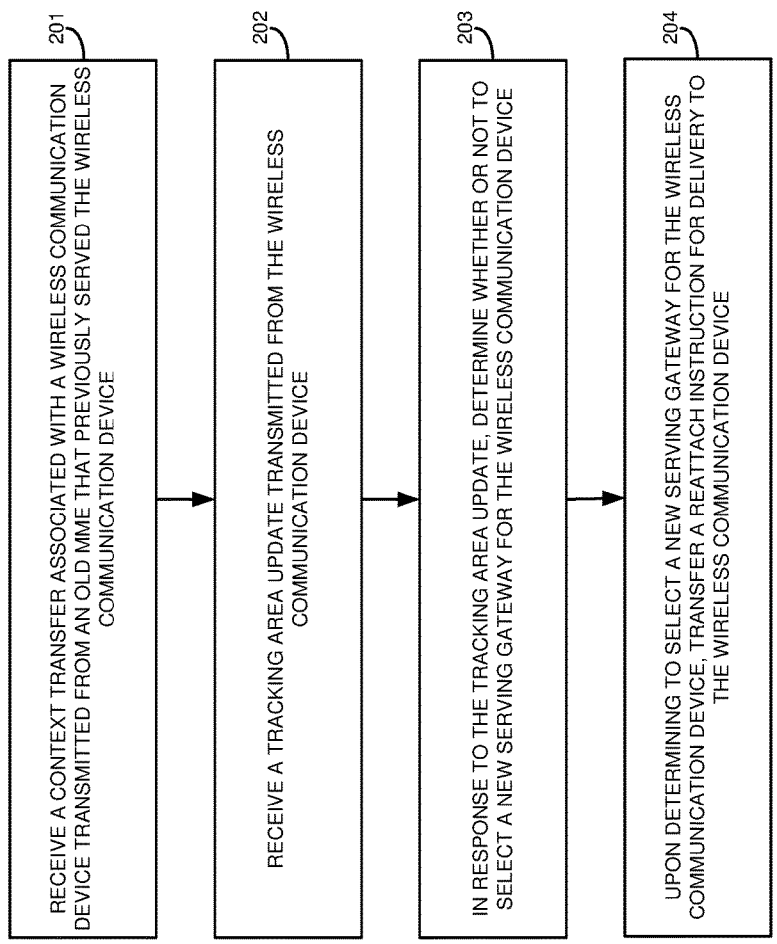
FIG. 2 is a flow diagram that illustrates an operation of the data communication system.

FIG. 2 is a flow diagram that illustrates an operation of data communication system 100. The steps of the operation are indicated below parenthetically. The operation shown in FIG. 2 may be employed by data communication system 100 to facilitate reselection of optimal network elements for a wireless communication device traversing MME regional boundaries. In order to illustrate its operations, the following discussion of the process shown in FIG. 2 will proceed with reference to MME 140 and other elements as shown in FIG. 1, but note that the details provided in FIG. 1 are merely exemplary and not intended to limit the scope of the process to the specific implementation shown therein.

In the operational flow of FIG. 2, MME 140 receives a context transfer associated with wireless communication device 101 transmitted from an old MME that previously served wireless communication device 101 (201). Although not shown in FIG. 1, the old MME that previously served wireless communication device 101 is typically located in a different geographic region than MME 140. For example, wireless communication device 101 may initially register with the network when located in a first region served by the old MME, and as a result of mobility actions, subsequently traverse an MME regional boundary into a second region served by MME 140. The MME regional boundaries could be defined by any designation that identifies or delineates a geographic area or region served by a particular MME, such as MME 140. For example, MME regional boundaries could be defined by the service provider network, such as according to different MME service areas, natural market boundaries, or could comprise government-defined areas such as cities, counties, or other municipalities in some examples. Typically, MME 140 would receive the context transfer from the old MME that previously served wireless communication device 101 by receiving the context transfer from the old MME after wireless communication device 101 traverses into a new MME regional boundary. In some examples, the context transfer could comprise a context response message sent from the old MME in response to a context request message from MME 140. The context transfer typically includes various information associated with wireless communication device 101 and its connection to the network as known to the old MME. For example, the context information could comprise an identifier of wireless communication device 101, such as an international mobile subscriber identity (IMSI), a serving gateway signaling address, a tunnel endpoint identifier (TEID), evolved packet system (EPS) bearer context information, and any other network attachment data for device 101 stored in the old MME.

MME 140 receives a tracking area update (TAU) transmitted from wireless communication device 101 (202). The TAU typically includes radio resource control (RRC) parameters and various LTE identifiers such as a globally unique temporary identifier (GUTI), a globally unique mobile management entity identifier (GUMMEI) of the old MME, a tracking area identity (TAI) last visited by device 101, core network capabilities, EPS bearer status, and any other information. Wireless communication device 101 may send the TAU for delivery to MME 140 for various reasons, such as when device 101 enters a new tracking area, based on a periodic timer, based on various states of device 101 when reselecting to the evolved universal terrestrial radio access network (E-UTRAN), upon release of the RRC connection for load rebalancing, upon changes to various parameters, or when instructed by the network, among others. In some examples, MME 140 may receive the TAU from eNodeB 110 as a TAU request message initially transmitted by wireless communication device 101. In this example, wireless communication device 101 transmits the TAU responsive to detecting that device 101 traversed an MME regional boundary.

In response to the tracking area update, MME 140 determines whether or not to select a new serving gateway 150 for wireless communication device 101 (203). Additionally or alternatively, in some examples MME 140 may also determine whether or not to select the new serving gateway 150 for wireless communication device 101 in response to receiving the context transfer. Typically, MME 140 would determine to select the new serving gateway 150 by determining that the old serving gateway cannot continue to serve wireless communication device 101. In some examples, MME 140 may determine whether or not to select the new serving gateway 150 for wireless communication device 101 by submitting a serving gateway query for wireless communication device 101 to a domain name system (DNS) server. For example, MME 140 may determine to select a new serving gateway 150 for wireless communication device 101 by receiving from the DNS server a response to the serving gateway query with an internet protocol (IP) address of the new serving gateway 150 for wireless communication device 101. In some examples, MME 140 may not actually determine or select a particular serving gateway 150 for wireless communication device 101 at this time, but simply determine that a new serving gateway for wireless communication device 101 should be selected.

Upon determining to select the new serving gateway 150 for wireless communication device 101, MME 140 transfers a reattach instruction for delivery to wireless communication device 101 (204). In some examples, MME 140 transfers the reattach instruction for delivery to wireless communication device 101 when device 101 is attached using an LTE radio access technology (RAT) type. For example, MME 140 may process the context transfer associated with wireless communication device 101 to determine that device 101 is attached using the LTE RAT type. Typically, the reattach instruction directs wireless communication device 101 to detach and immediately reattach to the network, forcing re-registration with the network. For example, the reattach instruction may trigger wireless communication device 101 to reattach and re-register with network core elements for optimal packet data network gateway (P-GW) and proxy call session control function (P-CSCF) assignment, among other network elements. In some examples, MME 140 may transfer the reattach instruction for delivery to wireless communication device 101 by transferring a deferred reattach instruction when wireless communication device 101 is engaged in a voice call. For example, in cases where wireless communication device 101 is actively engaged in a voice over LTE (VoLTE) voice call or any other communication session, MME 140 would send an instruction to wireless communication device 101 for deferred detach with reattach required upon termination of the voice call or communication session. However, if wireless communication device 101 is in an idle state, MME 140 would send the instruction to wireless communication device 101 for immediate detach with reattach required, forcing device 101 to re-register with network core elements.

Advantageously, by transferring the reattach instruction, MME 140 can trigger wireless communication device 101 to reattach and re-register with the network core elements when device 101 traverses an MME regional boundary. Upon re-registration, the MME selection logic will reassign the most optimal S-GW 150, P-GW 160, P-CSCF, and other network elements for wireless communication device 101. Accordingly, wireless communication device 101 will no longer be anchored to the old network elements in the previous MME regional boundary. In this manner, network latency is reduced for VoLTE voice calls and other IMS-based services, thereby improving the user experience. In addition, these techniques may provide further network optimizations by reducing the amount of traffic across the core network and improved handovers based on predefined entry points into respective MME regions.

Figure 3:
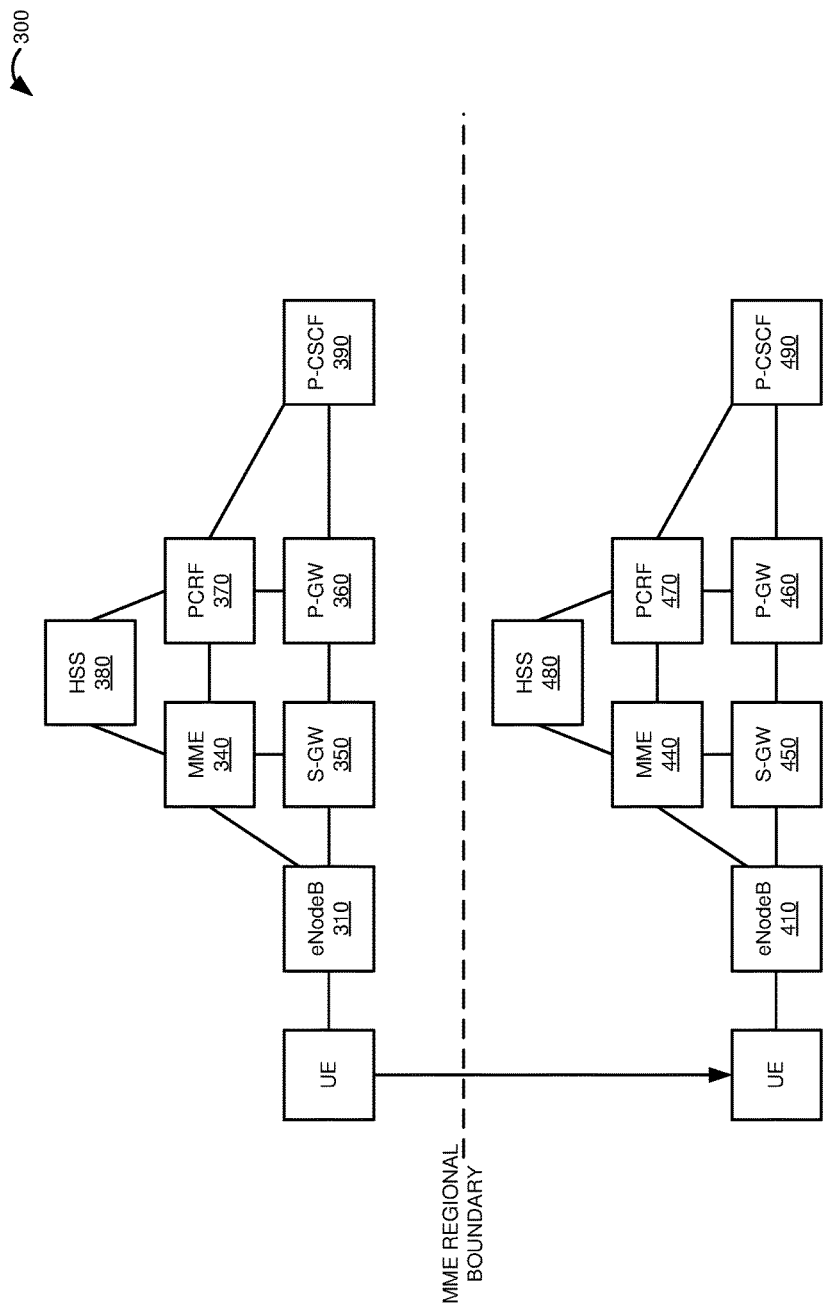
FIG. 3 is a block diagram that illustrates a data communication system in an exemplary embodiment.

FIG. 3 is a block diagram that illustrates data communication system 300 in an exemplary embodiment. Data communication system 300 is an example of data communication system 100, although data communication system 100 may use alternative configurations and operations. Data communication system 300 includes LTE and IMS network elements. This example illustrates different network elements in two different MME regions, separated by the dashed line appearing in FIG. 3 that represents an MME regional boundary. In the upper portion of FIG. 3, a first region of data communication system 300 includes Enhanced NodeB (eNodeB) base station 310, mobility management entity (MME) 340, serving gateway (S-GW) 350, packet data network gateway (P-GW) 360, policy and charging rules function (PCRF) 370, home subscriber server (HSS) 380, and a proxy call session control function (P-CSCF) 390. In the lower portion of FIG. 3, a second region of data communication system 300 includes eNodeB 410, MME 440, S-GW 450, P-GW 460, PCRF 470, HSS 480, and P-CSCF 490.

In operation, a user typically operates the user equipment (UE) to engage in a data session via the LTE access network. In this example, the UE is initially attached in the first region of data communication system 300 over eNodeB 310, MME 340, S-GW 350, P-GW 360, and P-CSCF 390. During session establishment for the UE, MME 340 typically performs DNS queries to determine the S-GW 350 and P-GW 360 to use to create the session. When the UE is engaged in a VoLTE call, the anchor point for the IP address of the UE and the bearer paths are at the selected P-GW 360 with the co-located P-CSCF 390 for media and IMS registration. As the UE traverses the MME regional boundary as a result of mobility actions, either during the active call or in idle mode, the anchor point continues to be at the same designated P-GW 360 and P-CSCF 390, in spite of the old MME 340 passing off the UE-related context information to the new MME 440 in the new region via the relevant S10 interface links. Unfortunately, this introduces an undesirable latency to the UE since voice, IP-based messaging, video calls, and other IMS-based services are routed over different MME regions.

As an exemplary scenario, the first region in the upper portion of FIG. 3 could represent Seattle, and the second region in the lower portion of FIG. 3 could represent Phoenix. The UE initially attaches via MME 340 to S-GW 350 in Seattle, where the P-GW 360 and P-CSCF 390 in Seattle are selected for this UE. The UE then engages in a voice call and starts moving southbound until the MME regional boundary is crossed and the UE enters the Phoenix MME region. At this point, MME 340 in Seattle transfers the UE-related context to the MME 440 in Phoenix, but the voice call is still anchored at Seattle. When the voice call ends, the UE still stays assigned to the Seattle P-GW 360 and P-CSCF 390. Subsequently, if the UE initiates or receives another voice call, or any other IMS-based service such as IP-based messaging, video call, or the like, the latency for the UE has increased as the Phoenix MME 440 is now serving the UE but the call remains anchored at Seattle. In addition, this condition will also drastically increase the latency when mini-macro or small cell location sites are utilized for VoLTE sessions. However, a detailed description of one technique to optimize the network latency for the UE and support an improved VoLTE user experience will now be discussed with respect to FIG. 4.

Figure 4:
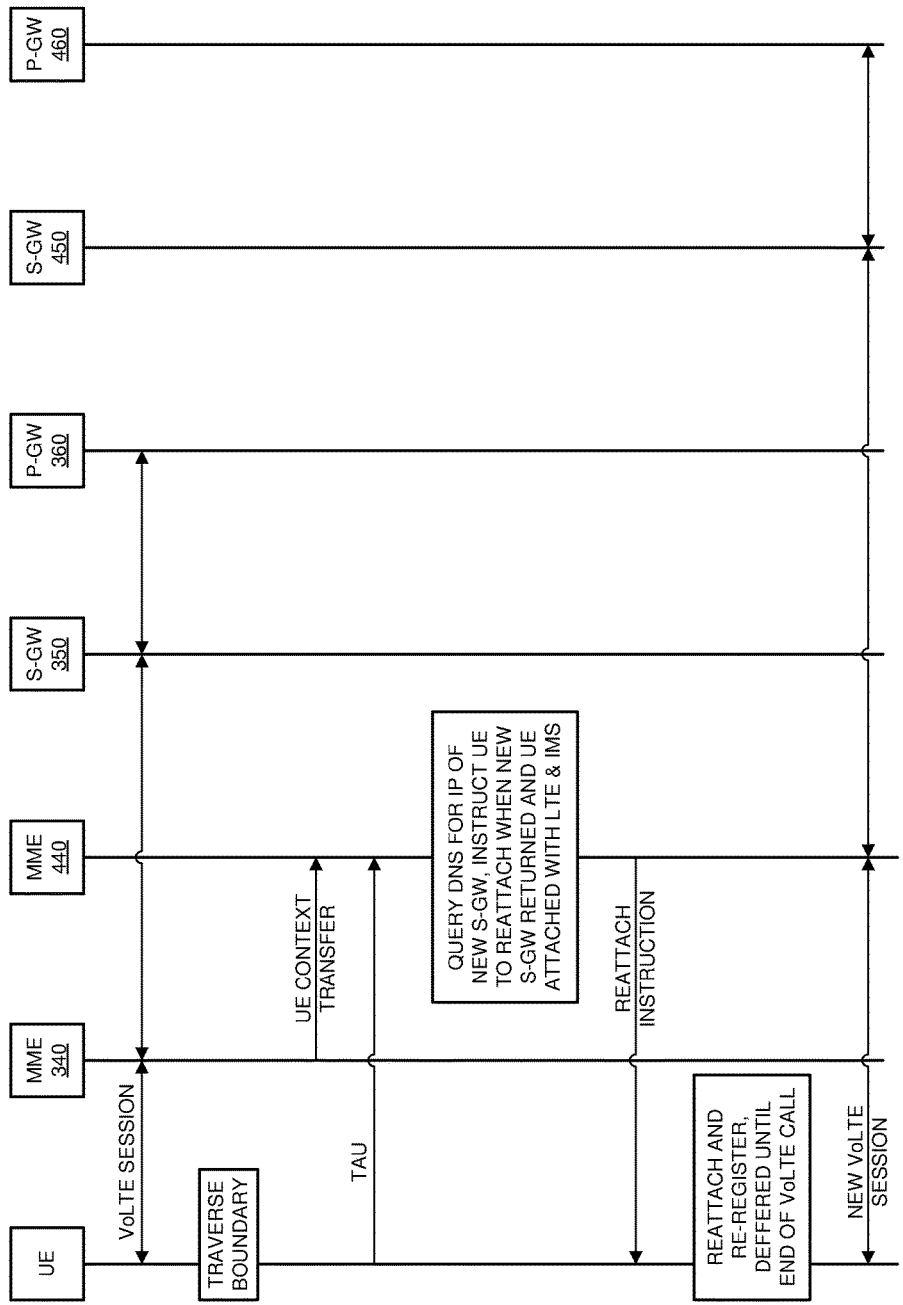
FIG. 4 is a sequence diagram that illustrates an operation of the data communication system in an exemplary embodiment.

FIG. 4 is a sequence diagram that illustrates an operation of data communication system 300 in an exemplary embodiment. The techniques described below allow for improved network latency for a VoLTE UE by providing an optimal assignment of network elements to the UE after crossing an MME regional boundary. Initially, the UE is engaged in a VoLTE session via MME 340 to S-GW 350, P-GW 360, and P-CSCF 390 in the first MME region shown in the upper portion of FIG. 3. In this example, when the VoLTE UE attaches in RAT type LTE, the UE requests packet data network connectivity for an IMS access point name (APN), and MME 340 follows standard procedures for S-GW and P-GW selection and issues a create session request towards P-GW 360 via S-GW 350.

During the VoLTE call session or afterwards during idle mode, as a result of mobility actions the UE traverses the MME regional boundary as shown by the dashed line in FIG. 3, and enters the second MME region illustrated in the lower portion of FIG. 3. The old MME 340 that previously served the UE transfers the UE context to the new MME 440. However, despite this context transfer from the old MME 340 to the new MME 440, the anchor point for the UE remains at the same designated P-GW 360 and P-CSCF 390 of the former MME region. In addition to the context transfer from MME 340 to MME 440, the UE also transfers a tracking area update (TAU) for delivery to the new MME 440. In some examples, the new MME 440 may first receive a TAU Request transmitted from the UE and responsively send a Context Request to the old MME 340 and receive the UE-related context in a Context Response message from the old MME 340. Regardless, the old MME 340 in the first region transfers the UE context information to the new MME 440 in the second region over the S10 interface. In response to the TAU, the new MME 440 queries a DNS server for the IP address of a new S-GW 450 in priority order. When the DNS query returns a new S-GW 450, and when the UE is attached using an LTE RAT type with IMS, then MME 440 instructs the UE to detach and reattach to the network.

In this example, since the DNS query returned a new S-GW 450 for the UE and the UE is attached in RAT type LTE with IMS, the new MME 450 transfers a reattach instruction for delivery to the UE. If the UE is still actively engaged in a VoLTE voice call with a quality of service (QoS) class identifier (QCI)-1 bearer, then MME 440 sends a deferred detach with reattach required on termination of the voice call. Responsive to this instruction, the UE would release the QCI-1 voice bearer upon termination of the call and trigger a detach and reattach to the network. Alternatively, if the voice call has already ended and the UE is in idle mode with a QCI-5 bearer, MME 440 sends a detach with reattach required instruction, which directs the UE to immediately detach and reattach to the network. When the UE reattaches to the network, the UE is forced to re-register with the network core elements, and the MME selection logic will reassign the most optimal S-GW 450, P-GW 460, and P-CSCF 490 to the UE. In this manner, network traffic may be reduced across the EPC core network, and latency for the UE is greatly reduced for supporting voice calls, IMS-based services, and session continuity. In addition, these techniques allow for optimal handovers based on predefined entry points into respective MME regions. Accordingly, network optimization and the user experience and can be substantially improved.

Figure 5:
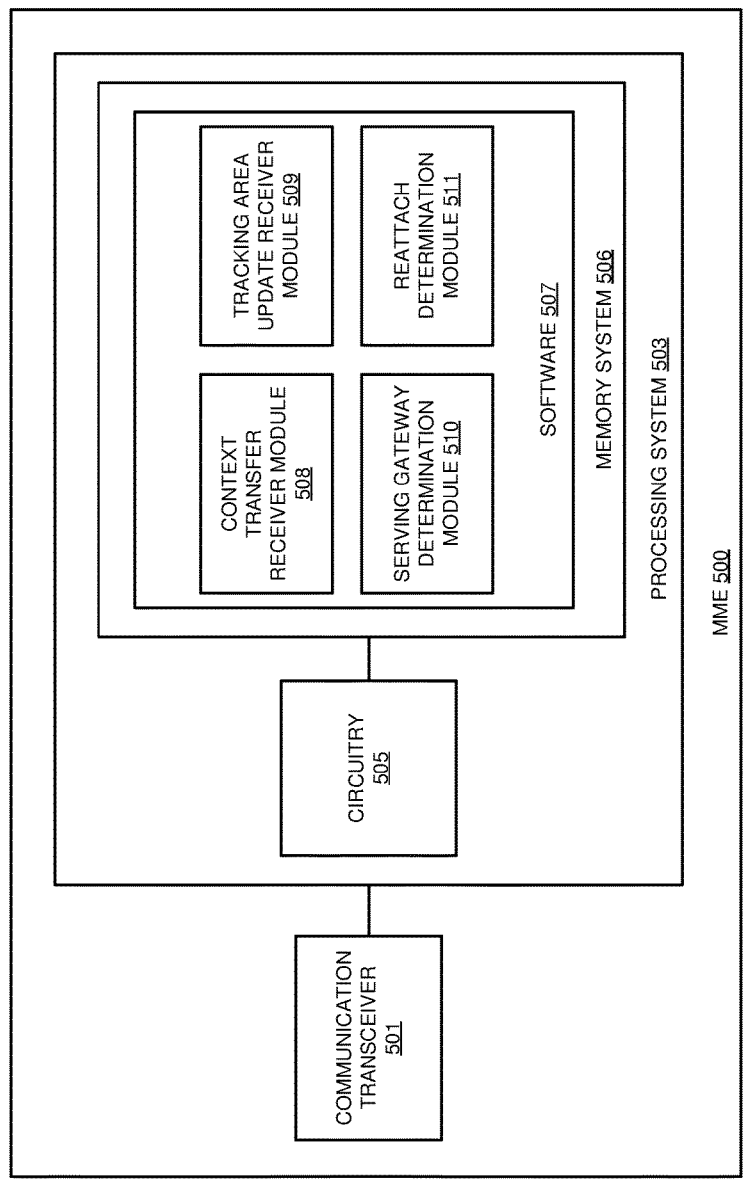
FIG. 5 is a block diagram that illustrates a mobility management entity (MME).

FIG. 5 is a block diagram that illustrates MME 500. MME 500 provides an example of MME 140, although MME 140 may have alternative configurations. MME 500 comprises communication transceiver 501 and processing system 503. Processing system 503 is linked to communication transceiver 501. Processing system 503 includes processing circuitry 505 and memory system 506 that stores operating software 507. Operating software 507 comprises software modules 508-511.

Communication transceiver 501 comprises components that communicate over communication links, such as network cards, ports, RF transceivers, processing circuitry and software, or some other communication components. Communication transceiver 501 may be configured to communicate over metallic, wireless, or optical links. Communication transceiver 501 may be configured to use time-division multiplexing (TDM), Internet Protocol (IP), SIP, Ethernet, optical networking, wireless protocols, communication signaling, or some other communication format, including combinations thereof. Communication transceiver 501 could be configured to receive a context transfer associated with a wireless communication device transmitted from an old MME that previously served the wireless communication device, and receive a tracking area update transmitted from the wireless communication device. Communication transceiver 501 could also be configured to transfer a reattach instruction for delivery to the wireless communication device.

Processing circuitry 505 comprises microprocessor and other circuitry that retrieves and executes operating software 507 from memory system 506. Processing circuitry 505 may comprise a single device or could be distributed across multiple devices, including devices in different geographic areas. Processing circuitry 505 may be embedded in various types of equipment. Examples of processing circuitry 505 include central processing units, application specific processors, logic devices, and/or any type of computer processing devices, including combinations thereof.

Memory system 506 may comprise any computer-readable media or storage media readable by processing system 503 and capable of storing software 507. In some examples, memory system 506 comprises a non-transitory computer-readable storage medium readable by processing circuitry 505 and capable of storing software 507, such as a disk drive, flash drive, data storage circuitry, or some other hardware memory apparatus. Memory system 506 may include volatile and nonvolatile, removable and non-removable media implemented in any method or technology for storage of information, such as computer-readable instructions, data structures, program modules, or other data. Memory system 506 may comprise a single device or could be distributed across multiple storage devices or sub-systems co-located or distributed relative to each other, including devices in different geographic areas. Memory system 506 may be embedded in various types of equipment. In some examples, a computer apparatus could comprise memory system 506 and operating software 507. Memory system 506 may comprise additional elements, such as a controller, capable of communicating with processing system 503. Examples of storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage media a propagated signal.

Operating software 507 may be implemented in program instructions and may be executed by processing system 503. Operating software 507 comprises computer programs, firmware, or some other form of machine-readable processing instructions. Operating software 507 may include an operating system, utilities, drivers, network interfaces, applications, or some other type of software. In this example, operating software 507 comprises software modules 508-511, although software 507 could have alternative configurations in other examples.

When executed by circuitry 505, operating software 507 directs processing system 503 to operate as described herein for MME 140. In particular, operating software 507 may direct processing system 503 to direct communication transceiver 501 to receive a context transfer associated with a wireless communication device transmitted from an old MME that previously served the wireless communication device. Operating software 507 may also direct processing system 503 to direct communication transceiver 501 to receive a tracking area update transmitted from the wireless communication device. Operating software 507 further directs processing system 503 to, in response to the tracking area update, determine whether or not to select a new serving gateway for the wireless communication device. Operating software 507 also directs processing system 503 to, upon determining to select the new serving gateway for the wireless communication device, transfer a reattach instruction for delivery to the wireless communication device.

In this example, operating software 507 comprises a context transfer receiver software module 508 that receives a context transfer associated with a wireless communication device transmitted from an old MME that previously served the wireless communication device. Operating software 507 also comprises a tracking area update receiver software module 509 that receives a tracking area update transmitted from the wireless communication device. Operating software 507 further comprises a serving gateway determination software module 510 that, in response to the tracking area update, determines whether or not to select a new serving gateway for the wireless communication device. Operating software 507 additionally comprises a reattach determination software module 511 that, upon determining to select the new serving gateway for the wireless communication device, transfers a reattach instruction for delivery to the wireless communication device.

Now referring back to FIG. 1, wireless communication device 101 comprises any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory system, software, processing circuitry, or some other communication components. For example, wireless communication device 101 could comprise a User Equipment (UE) device, telephone, transceiver, mobile phone, cellular phone, smartphone, computer, personal digital assistant (PDA), e-book, game console, mobile Internet device, wireless network interface card, media player, or some other wireless communication apparatus, including combinations thereof. Wireless communication device 101 could comprise a dual-mode device capable of communicating over multiple wireless protocols, including LTE wireless networks and non-LTE wireless networks. Wireless network protocols that may be utilized by wireless communication device 101 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long-Term Evolution (3GPP LTE), LTE Advanced, Worldwide Interoperability for Microwave Access (WiMAX), IEEE 802.11 wireless local area network (WLAN) protocols (Wi-Fi), Bluetooth, Internet, telephony, or any other wireless network protocol that facilitates communication between wireless communication device 101 and a communication network.

Wireless access node 110 comprises RF communication circuitry and an antenna. The RF communication circuitry typically includes amplifiers, filters, RF modulators, transceivers, and signal processing circuitry. Wireless access node 110 may also comprise a router, server, memory device, software, processing circuitry, cabling, power supply, network communication interface, structural support, or some other communication apparatus. Wireless access node 110 may further comprise a processing system, such as a microprocessor, computer-readable storage device, and executable processing instructions, which may be used to provide access to communication services to various devices. Wireless access node 110 could comprise a macro base station, pico base station, wireless access point, Internet access node, telephony service node, wireless data access point, or some other wireless communication system, including combinations thereof. Some examples of wireless access node 110 include a base transceiver station (BTS), base station controller (BSC), radio base station (RBS), Node B, enhanced Node B (eNodeB), pico eNodeB, relay node, relay backhaul node, picocell, femtocell, Wi-Fi hotspot, and others, including combinations thereof. Wireless network protocols that may be utilized by wireless access node 110 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format, including combinations thereof.

Communication network 130 comprises the core network of a wireless communication service provider, and could include routers, gateways, telecommunication switches, servers, processing systems, or other communication equipment and systems for providing communication and data services. In some examples, communication network 130 comprises a cellular voice and data network that can provide voice calls, text messages, data access, or other communication services provided over cellular or wireless communication networks. In some examples, communication network 130 includes equipment to provide wireless access to communication services within different coverage areas to user devices, route communications between content providers and user devices, and facilitate handoffs between equipment of different coverage areas, among other operations. Communication network 130 could comprise wireless communication nodes, telephony switches, Internet routers, network gateways, computer systems, communication links, or some other type of communication equipment, including combinations thereof. Communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems, including combinations thereof. Communication network 130 can also comprise elements such as mobility management entity (MME) equipment, home subscriber servers (HSS), policy and charging rules function (PCRF) nodes, packet data network gateways (P-GW), serving gateways (S-GW), base stations, base transceiver stations (BTS), base station controllers (BSC), eNodeB equipment, mobile switching centers (MSC), home location registers (HLR), radio node controllers (RNC), authentication, authorization and accounting (AAA) equipment, access service network gateways (ASN-GW), packet data switching nodes (PDSN), Internet access nodes, database systems, or other communication and control equipment. In some implementations, communication network 130 may also include an IMS, which may reside in a single device or may be distributed across multiple devices. In some examples, the IMS in communication network 130 could comprise a session boarder controller (SBC), proxy call session control function (P-CSCF), interrogating call session control function (I-CSCF), serving call session control function (S-CSCF), telephony application server (TAS), media resource function (MRF), application server, session initiation protocol (SIP) server, or some other communication system, including combinations thereof. Communication network 130 may be configured to communicate over metallic, wireless, or optical links, including combinations thereof. Communication network 130 may be configured to use time-division multiplexing (TDM), Internet Protocol (IP), Ethernet, optical networking, wireless protocols, communication signaling, or some other communication format, including combinations thereof. In some examples, communication network 130 includes further access nodes and associated equipment for providing communication services to many wireless communication devices across a large geographic region.

MME 140 comprises a processing system and communication transceiver. MME 140 may also include other components such as a router, server, data storage system, and power supply. MME 140 may reside in a single device or may be distributed across multiple devices. MME 140 may be a discrete system or may be integrated within other systems, including other systems within data communication system 100. In some examples, MME 140 could comprise a computing system, network element, application server, server system, session initiation protocol (SIP) server, remote diagnostics system, surveillance system, network switch, mobile switching center, router, switching system, home agent, packet gateway, network gateway system, Internet access node, service node, firewall, or some other communication system, including combinations thereof.

S-GW 150 comprises a processing system and communication transceiver. S-GW 150 may also include other components such as a router, server, data storage system, and power supply. S-GW 150 may reside in a single device or may be distributed across multiple devices. S-GW 150 may be a discrete system or may be integrated within other systems, including other systems within data communication system 100. In some examples, S-GW 150 could comprise a computing system, network element, application server, server system, session initiation protocol (SIP)

server, remote diagnostics system, surveillance system, network switch, mobile switching center, router, switching system, home agent, packet gateway, network gateway system, Internet access node, service node, firewall, or some other communication system, including combinations thereof.

P-GW 160 comprises a processing system and communication transceiver. P-GW 160 may also include other components such as a router, server, data storage system, and power supply. P-GW 160 may reside in a single device or may be distributed across multiple devices. P-GW 160 may be a discrete system or may be integrated within other systems, including other systems within data communication system 100. In some examples, P-GW 160 could comprise a computing system, network element, application server, server system, session initiation protocol (SIP) server, remote diagnostics system, surveillance system, network switch, mobile switching center, router, switching system, home agent, packet gateway, network gateway system, Internet access node, service node, firewall, or some other communication system, including combinations thereof.

Wireless communication link 111 use the air or space as the transport medium. Wireless communication link 111 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format, including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions, including combinations thereof.

Communication links 121, 131, and 141 use metal, air, space, optical fiber such as glass or plastic, or some other material as the transport medium, including combinations thereof. Communication links 121, 131, and 141 could use various communication protocols, such as TDM, IP, Ethernet, telephony, optical networking, hybrid fiber coax (HFC), communication signaling, wireless protocols such as such as CDMA, GSM, UMTS, HSPA, EV-DO, EV-DO rev. A, B, and C, 3GPP LTE, LTE Advanced, WiMAX, Wi-Fi, Bluetooth, or some other communication format, including combinations thereof. Communication links 121, 131, and 141 may be direct links or could include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a mobility management entity (MME) in a data communication system to facilitate reselection of optimal network elements for a wireless communication device traversing MME regional boundaries, the method comprising:

receiving, by the MME, a context transfer associated with the wireless communication device transmitted from an old MME that previously served the wireless communication device;

receiving a tracking area update transmitted from the wireless communication device;

in response to the tracking area update and the context transfer, selecting an optimal packet data network gateway (P-GW) and serving gateway (S-GW) for the wireless device, wherein the optimal P-GW assigns an optimal proxy call session control function (P-CSCF) for the wireless communication device; and transferring a reattach instruction for delivery to the wireless communication device which indicates the optimal P-GW, S-GW, and the P-CFCS, wherein the reattach instruction triggers the wireless communication device to reattach and re-register with the optimal P-GW, S-GW, and P-CSCF.

2. The method of claim 1 wherein receiving the context transfer from the old MME that previously served the wireless communication device comprises receiving the context transfer from the old MME after the wireless communication device traverses into a new MME regional boundary.

3. The method of claim 1 wherein transferring the reattach instruction for delivery to the wireless communication device comprises transferring a deferred reattach instruction when the wireless communication device is engaged in a voice call.

4. The method of claim 1 wherein transferring the reattach instruction for delivery to the wireless communication device comprises transferring the reattach instruction when the wireless communication device is attached using a long term evolution (LTE) radio access technology (RAT) type.

5. The method of claim 4 further comprising processing the context transfer associated with the wireless communication device to determine that the wireless communication device is attached using the LTE RAT type.

6. The method of claim 1 wherein selecting the S-GW for the wireless communication device comprises submitting an S-GW query for the wireless communication device to a domain name system (DNS) server.

7. A mobility management entity (MME) in a data communication system to facilitate reselection of optimal network elements for a wireless communication device traversing MME regional boundaries, the MME comprising:

a communication transceiver configured to receive a context transfer associated with the wireless communication device transmitted from an old MME that previously served the wireless communication device, and receive a tracking area update transmitted from the wireless communication device; and a processing system configured to, in response to the tracking area update and the context transfer, select an optimal packet data network gateway (P-GW) and serving gateway (S-GW) for the wireless device, wherein the optimal P-GW assigns an optimal proxy call session control function (P-CSCF) for the wireless communication device; and the processing system configured to direct the communication transceiver to transfer a reattach instruction for delivery to the wireless communication device which indicates the optimal P-GW, S-GW, and the P-CFCS, wherein the reattach instruction triggers the wireless communication device to reattach and re-register with the optimal P-GW, S-GW, and P-CSCF.

8. The MME of claim 7 wherein the communication transceiver configured to receive the context transfer from the old MME that previously served the wireless communication device comprises the communication transceiver configured to receive the context transfer from the old MME after the wireless communication device traverses into a new MME regional boundary.

9. The MME of claim 7 wherein the processing system configured to direct the communication transceiver to transfer the reattach instruction for delivery to the wireless communication device comprises the processing system configured to direct the communication transceiver to transfer a deferred reattach instruction when the wireless communication device is engaged in a voice call.

10. The MME of claim 7 wherein the processing system configured to direct the communication transceiver to transfer the reattach instruction for delivery to the wireless communication device comprises the processing system configured to direct the communication transceiver to transfer the reattach instruction when the wireless communication device is attached using a long term evolution (LTE) radio access technology (RAT) type.

11. The MME of claim 10 wherein the processing system is configured to process the context transfer associated with the wireless communication device to determine that the wireless communication device is attached using the LTE RAT type.

12. The MME of claim 7 wherein the processing system configured to select the optimal S-GW for the wireless communication device comprises the processing system configured to submit a S-GW query for the wireless communication device to a domain name system (DNS) server.

13. One or more computer-readable storage media to facilitate reselection of optimal network elements for a wireless communication device traversing mobility management entity (MME) regional boundaries, comprising:
    program instructions stored on the one or more computer-readable storage media that, when executed by an MME, direct the MME to at least:
        receive a context transfer associated with the wireless communication device transmitted from an old MME that previously served the wireless communication device;
        receive a tracking area update transmitted from the wireless communication device;
        in response to the tracking area update and the context transfer, select an optimal packet data network gateway (P-GW) and serving gateway (S-GW) for the wireless device, wherein the optimal P-GW assigns an optimal proxy call session control function (P-CSCF) for the wireless communication device; and
    transfer a reattach instruction for delivery to the wireless communication device which indicates the optimal P-GW, S-GW, and the P-CFCS, wherein the reattach instruction triggers the wireless communication device to reattach and re-register with the optimal P-GW, S-GW, and P-CSCF.

14. The one or more computer-readable storage media of claim 13 wherein the program instructions direct the MME to receive the context transfer from the old MME that previously served the wireless communication device by directing the MME to receive the context transfer from the old MME after the wireless communication device traverses into a new MME regional boundary.

15. The one or more computer-readable storage media of claim 13 wherein the program instructions direct the MME to transfer the reattach instruction for delivery to the wireless communication device by directing the MME to transfer a deferred reattach instruction when the wireless communication device is engaged in a voice call.

16. The one or more computer-readable storage media of claim 13 wherein the program instructions direct the MME to transfer the reattach instruction for delivery to the wireless communication device by directing the MME to transfer the reattach instruction when the wireless communication device is attached using a long term evolution (LTE) radio access technology (RAT) type.

17. The one or more computer-readable storage media of claim 16 wherein the program instructions direct the MME to process the context transfer associated with the wireless communication device to determine that the wireless communication device is attached using the LTE RAT type.

* * * * *